(12) United States Patent
Kore

(10) Patent No.: US 6,385,517 B1
(45) Date of Patent: May 7, 2002

(54) PASSENGER PROTECTING APPARATUS FOR USE IN A VEHICLE

(75) Inventor: Haruhisa Kore, Fuchu-cho (JP)

(73) Assignee: Mazda Motor Corporation (JP)

( * ) Notice: Subject to any disclaimer, the term of this patent is extended or adjusted under 35 U.S.C. 154(b) by 0 days.

(21) Appl. No.: 09/504,331

(22) Filed: Feb. 14, 2000

(30) Foreign Application Priority Data

Feb. 16, 1999 (JP) .............................................. 11-037784

(51) Int. Cl.⁷ .............................................. B60R 21/01
(52) U.S. Cl. ........................... 701/45; 180/271; 180/282
(58) Field of Search .......................... 280/806; 180/268, 180/271, 273, 282; 701/45

(56) References Cited

U.S. PATENT DOCUMENTS

| | | | |
|---|---|---|---|
| 3,420,572 A | | 1/1969 | Bisland |
| 3,838,870 A | | 10/1974 | Hug |
| 4,645,233 A | * | 2/1987 | Bruse et al. ................. 280/808 |
| 5,186,494 A | * | 2/1993 | Shimose |
| 5,378,043 A | * | 1/1995 | Viano et al. ................. 297/408 |
| 5,552,986 A | | 9/1996 | Omura et al. |
| 5,626,359 A | * | 5/1997 | Steffens, Jr. et al. ........ 280/735 |
| 5,670,853 A | * | 9/1997 | Bauer .......................... 318/286 |
| 5,694,320 A | | 12/1997 | Breed |
| 5,748,473 A | * | 5/1998 | Breed et al. .......... 364/424.055 |
| 5,785,347 A | * | 7/1998 | Adolph et al. .............. 280/735 |
| 5,788,281 A | | 8/1998 | Yanagi et al. |
| 5,822,707 A | * | 10/1998 | Breed et al. ................... 701/49 |
| 5,823,619 A | | 10/1998 | Heilig et al. |
| 5,890,084 A | * | 3/1999 | Halasz et al. ................. 701/45 |
| 5,927,804 A | * | 7/1999 | Cuevas .................. 297/216.12 |
| 6,088,640 A | * | 7/2000 | Breed .......................... 701/45 |
| 6,142,524 A | * | 11/2000 | Brown et al. ............... 280/806 |
| 6,155,601 A | * | 12/2000 | Cantor et al. ............... 280/806 |
| 6,209,909 B1 | * | 4/2001 | Breed .......................... 280/735 |
| 6,213,511 B1 | * | 4/2001 | Downie et al. ............. 280/806 |
| 6,213,512 B1 | * | 4/2001 | Swann et al. ............... 280/806 |
| 6,278,360 B1 | * | 8/2001 | Yanagi ........................ 340/436 |

FOREIGN PATENT DOCUMENTS

| | | |
|---|---|---|
| DE | 197 54 311 A1 | 12/1998 |
| EP | 0 627 340 A1 | 12/1994 |
| JP | 10000973 | 1/1998 |
| JP | 10006832 | 1/1998 |
| WO | WO 98/09838 | 3/1998 |

* cited by examiner

*Primary Examiner*—J. J. Swann
*Assistant Examiner*—J. Allen Shriver
(74) *Attorney, Agent, or Firm*—Brooks & Kushman P.C.

(57) ABSTRACT

A passenger protecting apparatus is provided with a head rest driving mechanism for driving a head rest forward according to a pressing contact force generated when a passenger's back is pressed against a seat back during a rear crash of the vehicle, a rear crash predictor for predicting a rear crash of the vehicle, and a passenger moving mechanism for moving the passenger toward the seat back when the rear crash of the vehicle is predicted by the rear crash predictor. The passenger's head can be effectively supported by the head rest during the rear crash of the vehicle.

13 Claims, 10 Drawing Sheets

|  |  | STOP | LOW · MEDIUM SPEED | HIGH SPEED |
|---|---|---|---|---|
| DISTANCE L | LARGE | HIGH TORQUE PULLING | MEDIUM TORQUE PULLING | PROHIBITED |
|  | SMALL | MEDIUM TORQUE PULLING | LOW TORQUE PULLING | PROHIBITED |

| SEATING POSTURE | CONTACT DETEDTORS | | | DRIVING FORCE |
|---|---|---|---|---|
| | 21 | 22 | 23 | |
| A | ON | ON | ON | MEDIUM |
| B | OFF | ON | ON | LARGE |
| C | OFF | OFF | ON | SMALL |
| D | OFF | OFF | OFF | PROHIBITED |

PASSENGER PROTECTING APPARATUS FOR USE IN A VEHICLE

This application is based on patent application No. 11-37784 filed in Japan, the contents of which are hereby incorporated by references.

BACKGROUND OF THE INVENTION

This invention relates to a passenger protecting apparatus for use in a vehicle, in particular to a passenger protecting apparatus provided with a head rest driving mechanism for driving a head rest forward according to a pressing contact force generated when the back of a passenger is pressed against a seat back during a rear crash of the vehicle.

Conventionally, there have been known apparatuses for sliding a contact position of a head rest with a passenger's head toward a center of gravity of his head during a rear crash of a vehicle to effectively support his head by the head rest. These apparatuses are constructed, for example, as disclosed in Japanese Unexamined Patent Publication No. 10-973 such that a pressure receiving belt is formed by mounting a belt between an upper frame and a lower frame of a seat back frame behind a cushioning member mounted on the seat back frame in a seat back of a vehicle seat and a head rest is moved forward according to the displacement of the pressure receiving belt. Alternatively, they are constructed, as disclosed in Japanese Unexamined Patent Publication No. 10-6832, such that an impact absorbing member is provided at the seat back and a head rest mover is provided to slide the head rest obliquely upward at the front part of the vehicle according to the movement of the impact absorbing member to the back side of the vehicle.

The vehicle seat whose head rest is moved forward according to the pressing contact force generated when the passenger's back is pressed against the seat back during the rear crash of the vehicle has a problem that the head rest cannot be effectively moved forward by the head rest mover if the seating posture of the passenger is improper. More specifically, if the rear crash occurs while the passenger's back is away from the seat back, the passenger's back cannot be sufficiently pressed against the seat back. Accordingly, the head rest mover cannot be properly operated, with the result that the passenger's head cannot be effectively supported by the head rest.

SUMMARY OF THE INVENTION

It is an object of the invention to provide a passenger protecting apparatus for use in a vehicle which has overcome the problems residing in the prior art.

It is another object of the invention to provide a passenger protecting apparatus which can effectively support a passenger's head by a head rest during a rear crash of the vehicle.

According to an aspect of the invention, a passenger protecting apparatus is provided with a head rest driving mechanism for driving a head rest forward according to a pressing contact force generated when the passenger back is pressed against the seat back during a rear crash of the vehicle, a rear crash predictor for predicting a rear crash of the vehicle, and a contact mechanism for making the passenger contact with the seat back when a rear crash of the vehicle is predicted by the rear crash predictor. The contact mechanism may include a passenger moving mechanism for moving the passenger toward the seat back when a rear crash of the vehicle is predicted by the rear crash predictor. Alternatively, the contact mechanism may include an inclining mechanism for inclining the seat back forward of a vehicle body when the rear crash of the vehicle is predicted by the rear crash predictor.

Accordingly, even if the passenger or the driver is bending forward when a rear crash is predicted, his back can be securely pressed against the seat back during the rear crash of the vehicle. Therefore, the head rest can be moved forward by the head rest driving mechanism during the rear crash of the vehicle to effectively support the passenger's head by the head rest.

These and other object, features and advantages of the present invention will become apparatus upon reading the following detailed description along with accompanying drawings.

DETAILED DESCRIPTION OF THE PREFERRED EMBODIMENTS OF THE INVENTION

Figure 1:
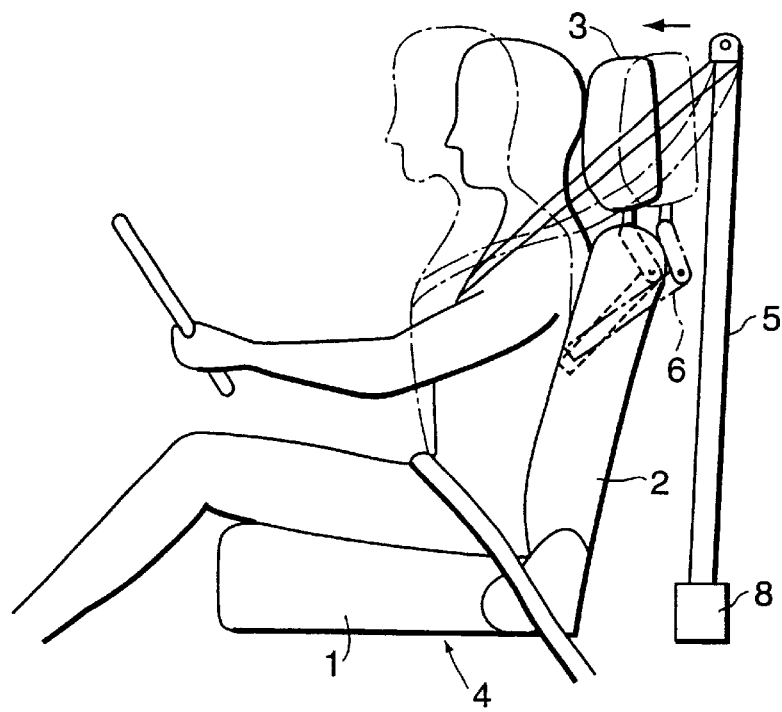
FIG. 1 is a diagram showing a passenger protecting apparatus for use in a vehicle according to a first embodiment of the invention.

Preferred embodiments of the invention will be described with reference to drawings. It should be noted that like elements are given like reference numerals throughout the description.

Figure 2:
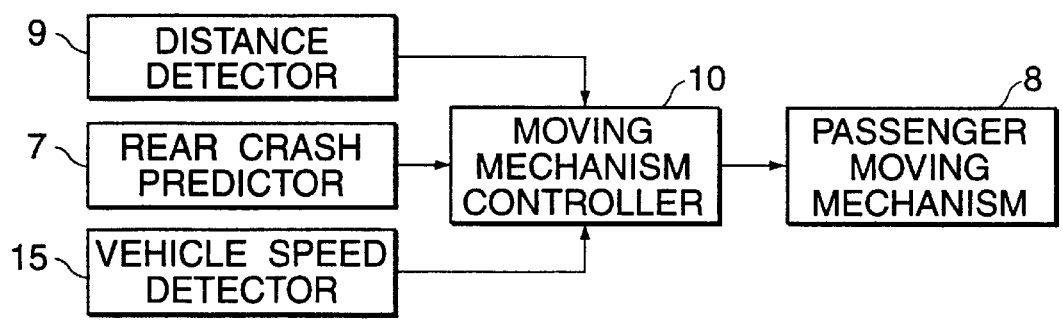
FIG. 2 is a block diagram showing a construction of the passenger protecting apparatus.

FIGS. 1 and 2 show a passenger protecting apparatus for use in a vehicle according to a first embodiment of the invention. This passenger protecting apparatus includes a seat 4 comprised of a seat cushion 1, a seat back 2 and a head rest 3, a seat belt 5 for fastening a passenger's body to the seat 4, a head rest driving mechanism 6, a rear crash predictor 7 for predicting a rear crash of a vehicle, a passenger moving mechanism 8, a distance detector 9, and a moving mechanism controller 10. The head rest driving mechanism 6 drives the head rest 3 forward according to a pressing contact force created when the passenger's back is pressed against the seat back 2 during a rear crash of the vehicle. The passenger moving mechanism 8 drives the seat belt 5 in a take-up direction when the rear crash of the vehicle is predicted by the rear crash predictor 7, thereby moving the passenger toward the seat back 2. The distance detector 9 detects a distance L between the passenger's head and the head rest 3. The moving mechanism controller 10 controls a driving force of the passenger moving mechanism 8 according to the distance L between the passenger's head and the head rest 3 which is detected by the distance detector 9.

The head rest driving mechanism 6 is constructed by a mechanical driving mechanism which drives the head rest 3 forward according to the pressing contact force generated when the passenger's back is pressed against the seat back 2 as known in the art. Alternatively, the head rest driving mechanism 6 may be constructed by an electric driving mechanism such as a solenoid or electric motor which drives the head rest 3 forward in accordance with a detection signal of a contact detector for detecting that the passenger's back is pressed against the seat back 2.

The rear crash predictor 7 is constructed such that a rear crash prediction signal is outputted to the moving mechanism controller 10 when a crash of an other vehicle on the rear part of the vehicle is predicted to be unavoidable by detecting a relative distance and a relative speed with respect to the other vehicle in accordance with a detection signal of an ultrasonic sensor, an infrared sensor, a radar or the like.

Figure 3:
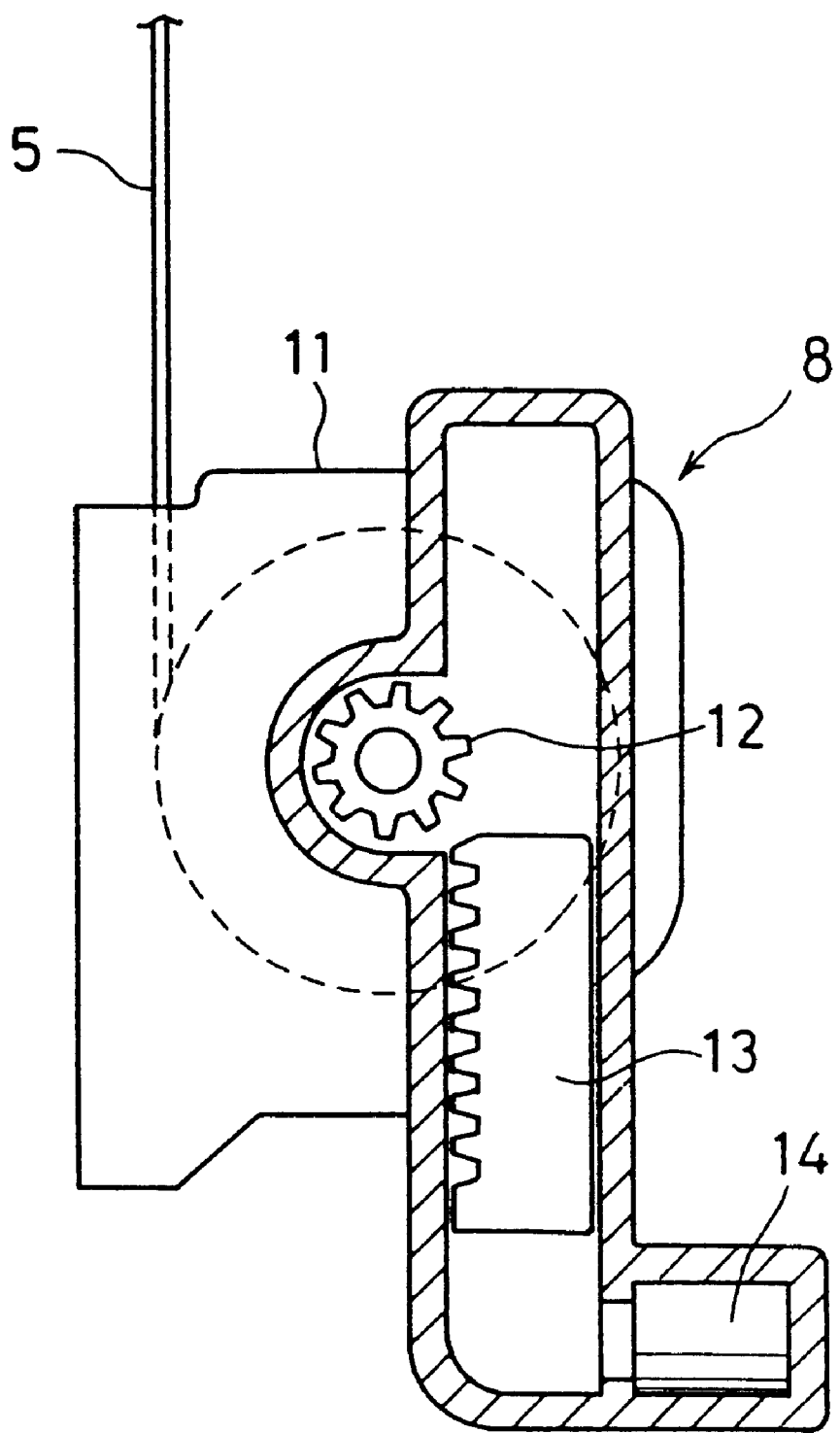
FIG. 3 is a sectional view showing a construction of a passenger moving mechanism of the apparatus.

The passenger moving mechanism 8 is, as shown in FIG. 3, provided with a take-up reel 11 for taking up the seat belt 5 with a specified spring force, a pinion gear 12 coupled to a drive shaft of the take-up reel 11, a rack gear 13 for rotating the pinion gear 12, and a pre-tensioner having a gas generator 14 for driving the rack gear 13, and is so constructed as to actuate the gas generator 14 in accordance with a control signal outputted from the moving mechanism controller 10 when the rear crash of the vehicle is predicted. In this way, a gas pressure for moving the rack gear 13 from a lower standby position to an upper driving position is generated to rotate the pinion gear 12, thereby taking up the seat belt 5 by the take-reel 11. As a result, a specified tension is given to the seat belt 5. The passenger moving mechanism 8 may be constructed by a pre-tensioner having an electric motor for rotating the take-up reel 11 as a driving source instead of the rack gear 13 and the gas generator 14.

The distance detector 9 includes an ultrasonic sensor, an infrared sensor, or like sensor mounted on the front surface of the head rest 3 for detecting the distance L between the passenger's head and the head rest 3, and outputs a detection signal to the moving mechanism controller 10.

Figures 4, 5:
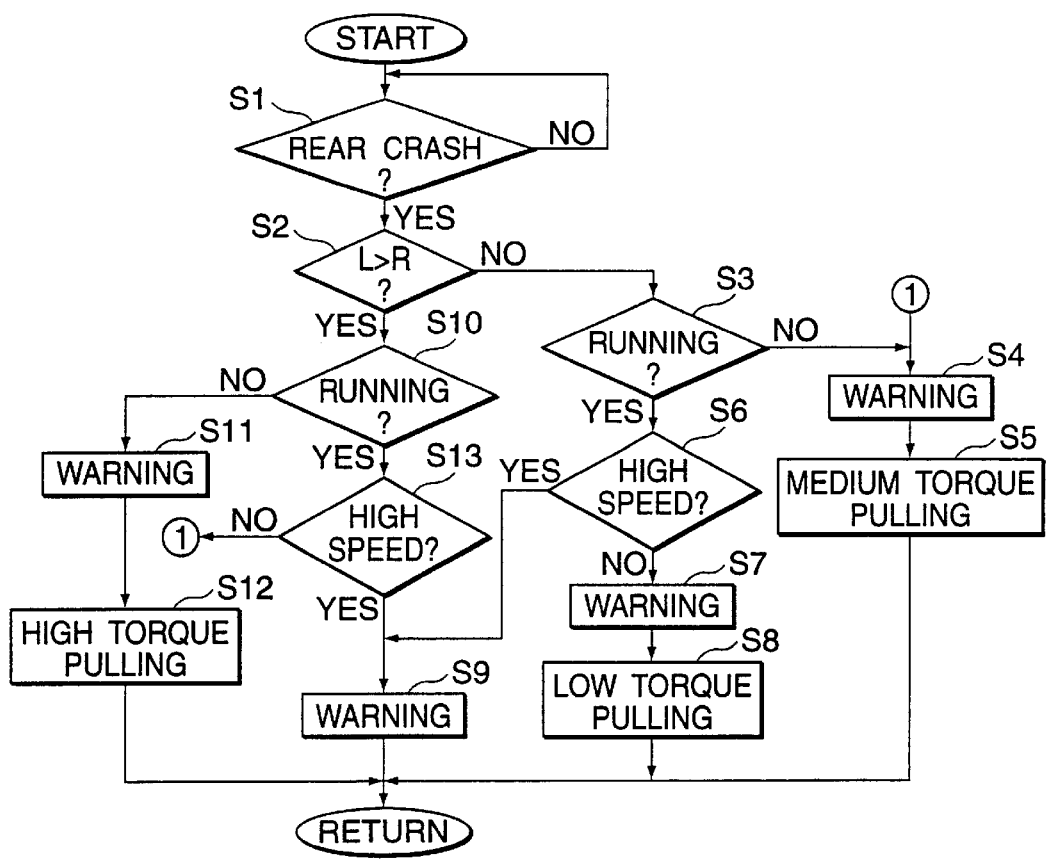
FIG. 4 is a map for driving force control for the passenger moving mechanism.
FIG. 5 is a flowchart showing a sequence of operations of the passenger protecting apparatus.

The moving mechanism controller 10 outputs an actuation command signal to the passenger moving mechanism 8 to take up the seat belt 5 when it is confirmed, based on an output signal of the rear crash predictor 7, that the rear crash of the vehicle is unavoidable, and controls the driving force of the passenger moving mechanism 8 based on the detection signals of the distance detector 9 and a vehicle speed detector 15 for detecting a running speed of the vehicle, and a map defined using the vehicle speed and the distance L between the passenger's head and the head rest 3 as parameters as shown in FIG. 4.

More specifically, if the distance L between the passenger's head and the head rest 3 is confirmed to be large while the vehicle is at a stop where the vehicle speed is zero, the driving force is set to pull the seat belt 5 with a high torque by, for example, generating a large amount of gas from the gas generator 14. On the other hand, if the distance L is confirmed to be small, the driving force is set to pull the seat belt 5 with a medium torque by, for example, generating a medium amount of gas from the gas generator 14.

Further, if the distance L between the passenger's head and the head rest 3 is confirmed to be large while the vehicle is running at a low or medium speed, the driving force is set to pull the seat belt 5 with a medium torque. On the other hand, if the distance L is confirmed to be small, the driving force is set to pull the seat belt 5 with a low torque by, for example, generating a small amount of gas from the gas generator 14. If the vehicle speed detected by the vehicle speed detector 15 is higher than a predetermined reference vehicle speed, the take-up of the seat belt 5 is prohibited.

A control executed in the moving mechanism controller 10 of the passenger protecting apparatus is described with reference to a flowchart shown in FIG. 5. When the control is started, it is first discriminated whether the rear crash prediction signal has been outputted from the rear crash predictor 7 (Step S1). When the discrimination result in Step S1 is affirmative, it is discriminated whether the distance L detected by the distance detector 9 is larger than a predetermined value R set in advance (Step S2). If the distance L is discriminated to be smaller than the predetermined value R (NO in Step S2), whether or not the vehicle is running is discriminated in accordance with the detection signal of the vehicle speed detector 15 (Step S3). If the vehicle is discriminated to be at a stop (NO in Step S3), the passenger moving mechanism 8 is actuated while setting its seat belt pulling torque at medium level (Step S5) after an unillustrated warning device is actuated to give a rear crash warning (Step S4).

If the vehicle is discriminated to be running (YES in Step S3), it is discriminated whether the vehicle is running at a high speed (Step S6). If the vehicle is discriminated to be running at a low or medium speed (NO in Step S6), the passenger moving mechanism 8 is actuated while setting its seat belt pulling torque at low level (Step S8) after the rear crash warning is given (Step S7). If the vehicle is discriminated to be running at a high speed (YES in Step S6), this routine returns without actuating the passenger moving mechanism 8 after the rear crash warning is given (Step S9).

On the other hand, if the vehicle speed is discriminated to be higher than the predetermined value R (YES in Step S2), whether or not the vehicle is running is discriminated in accordance with the detection signal of the vehicle speed detector 15 (Step S10). If the vehicle is discriminated to be at a stop (NO in Step S10), the passenger moving mechanism 8 is actuated while setting its seat belt pulling torque at high level (Step S12) after the unillustrated warning device is actuated to give a rear crash warning (Step S11).

If the vehicle is discriminated to be running (YES in Step S10), it is discriminated whether the vehicle is running at a high speed (Step S13). If the vehicle is discriminated to be running at a low or medium speed (NO in Step S13), the passenger moving mechanism 8 is actuated while setting its seat belt pulling torque at medium level (Step S5) after the rear crash warning is given (Step S4). If the vehicle is discriminated to be running at a high speed (YES in Step S13), this routine returns without actuating the passenger moving mechanism 8 after the rear crash warning is given (Step S9).

As described above, the passenger protecting apparatus is provided with the head rest driving mechanism 6 for driving the head rest 3 forward according to the pressing contact force generated when the passenger's back is pressed against the seat back 2 during the rear crash of the vehicle, the rear crash predictor 7 for predicting the rear crash of the vehicle, and the passenger moving mechanism 8 for moving the passenger toward the seat back 2 when the rear crash of the vehicle is predicted by the rear crash predictor 7. Accordingly, even if the passenger is seated while bending forward as shown by phantom line of FIG. 1 when the rear crash is predicted, the passenger's back can be securely pressed against the seat back 2 during the rear crash of the vehicle by moving the passenger toward the seat back 2 by the passenger moving mechanism 8. Thus, the head rest 3 can be securely moved forward by the head rest driving mechanism 6 according to the pressing contact force created when the passenger's back is pressed against the seat back 2 during the rear crash of the vehicle, with the result that the passenger's head can be effectively supported by the head rest 3.

Particularly, since the passenger moving mechanism 8 is constructed by the pre-tensioner of the seat belt 5 in this embodiment, the passenger is moved toward the seat back 2 by the pre-tensioner when the rear crash of the vehicle is predicted by the rear crash predictor 7. Therefore, the passenger can be effectively protected with his back pressed against the seat back 2 during the rear crash of the vehicle.

Further, the passenger protecting apparatus is also provided with the distance detector 9 for detecting the distance L between the passenger's head and the head rest 3, and the moving mechanism controller 10 for controlling the driving force of the passenger moving mechanism 8 according to the distance L detected by the distance detector 9 in this embodiment. Accordingly, the driving force of the passenger moving mechanism 8 can be controlled such that the head rest 3 can be properly moved forward by effectively pressing the passenger's back against the seat back 2 during the rear crash of the vehicle while preventing his body from being unnecessarily restricted by the seat belt 5.

More specifically, when the distance L between the passenger's head and the head rest 3 detected by the distance detector 9 is larger than the predetermined value R as described in the foregoing embodiment, the driving force of the passenger moving mechanism 8 is set larger than when the distance L is smaller than the predetermined value R. Thus, the passenger seated in a position away from the seat back 2 can be quickly moved toward the seat back 2 and pressed thereagainst with a specified pressing contact force when the rear crash of the vehicle is predicted. Further, when the distance L between the head and the head rest 3 is smaller than the predetermined value R, the driving force of the passenger moving mechanism 8 is set at a small value in order to prevent the passenger's back from being biased against the seat back 2 with a driving force larger than necessary.

Figure 6:
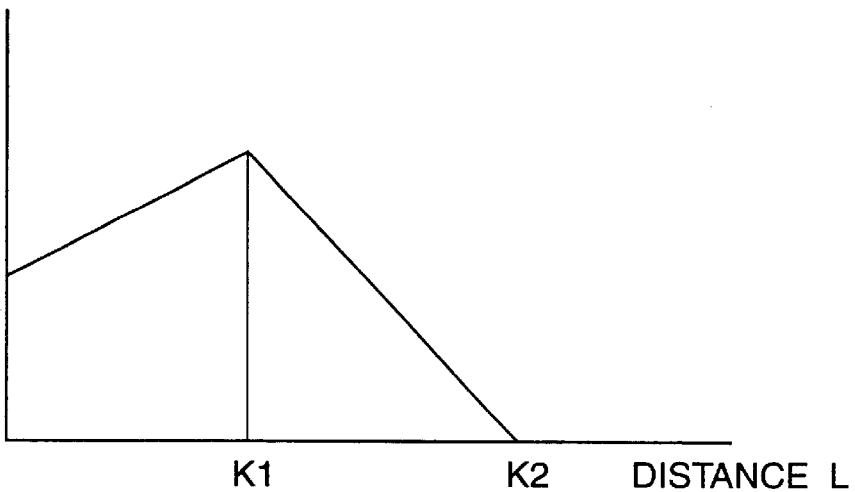
FIG. 6 is a graph showing a driving force control for the passenger moving mechanism in relation to a distance between a passenger's head and a head rest.

The driving force of the passenger moving mechanism 8 is changeable in two stages according to the distance L between the passenger's head and the head rest 3 detected by the distance detector 9 in the foregoing embodiment. However, the driving force of the passenger moving mechanism 8 may be continuously changeable according to the distance L as shown in FIG. 6. In other words, the driving force of the passenger moving mechanism 8 increases as the distance L increases in a range where the distance L is smaller than a predetermined first reference value K1 while decreasing as the distance L increases than the first reference value K1, and the driving of the passenger's driving mechanism 8 is prohibited when the distance L is larger than a predetermined second reference value K2.

With the above construction, the passenger's seat is quickly pressed against the seat back 2 by setting the driving force of the passenger moving mechanism 8 larger as the distance L increases in the area where the distance L is smaller than the first reference value K1 when the rear crash of the vehicle is predicted. Further, in the area where the distance L is larger than the first reference value K1, i.e., in the state where the passenger is seated largely away from the seat back 2, for example, during the backward driving of the vehicle, an undesirable event where the passenger's driving posture is restricted by being biased against the seat back 2 with the driving force larger than necessary can be effectively prevented.

Figure 7:
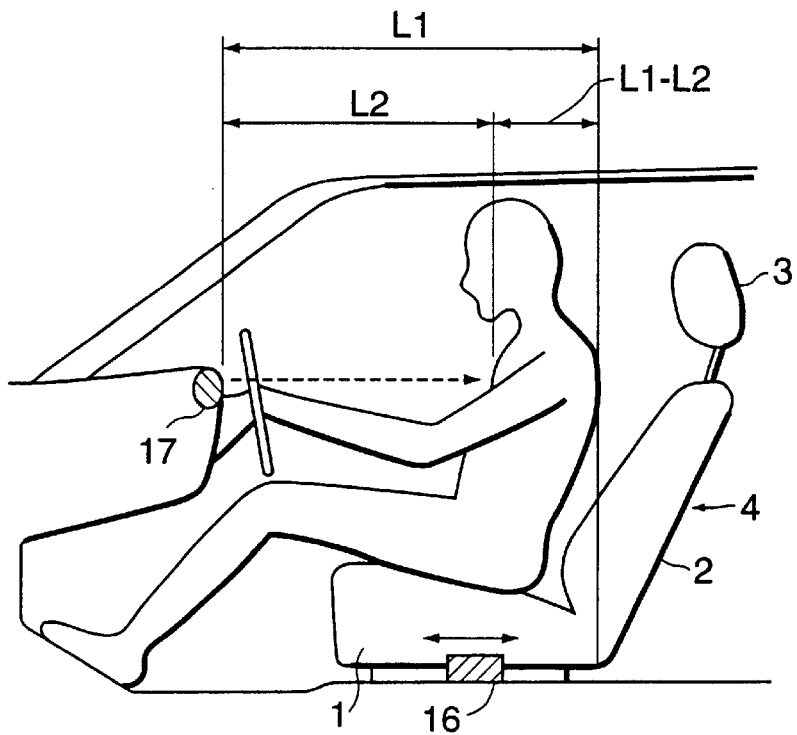
FIG. 7 is a diagram showing a modified distance detection.

In the foregoing embodiment, the distance L between the passenger's head and the head rest 3 is directly detected by the distance detector 9 provided at the front surface of the head rest 3. However, it may be obtained by calculating a distance (L1–L2) corresponding to the distance L between the passenger's head and the head rest 3 as shown in FIG. 7 in accordance with a detection signal of a seat slide position sensor 16 for detecting a distance L1 from a measurement reference position at the front to a forward/backward slide position of the seat 4 and a detection signal of a passenger detector 17 comprised of an ultrasonic sensor or an infrared sensor for detecting a distance L2 from the measurement reference position to the seated position of the passenger.

Figure 8:
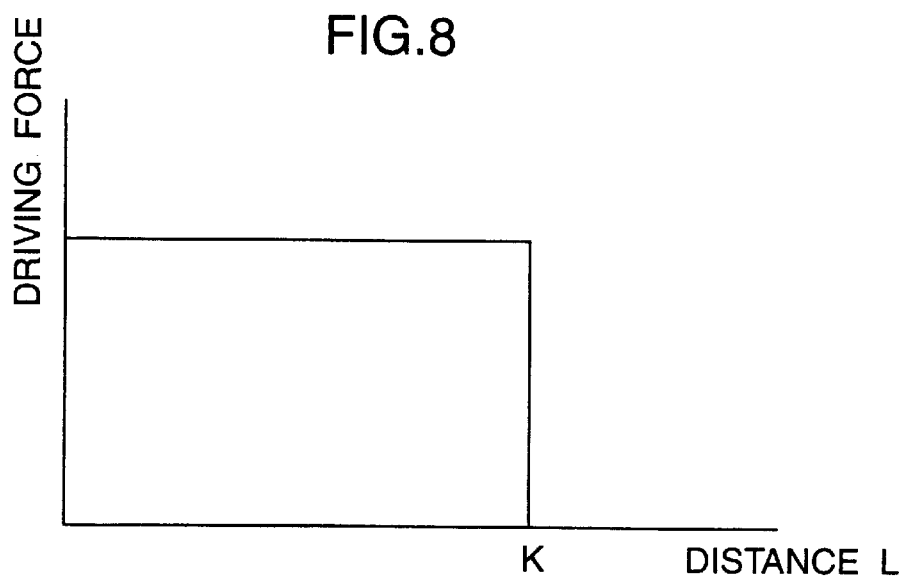
FIG. 8 is a graph showing a modified driving force control for the passenger moving mechanism.

Further, as shown in FIG. 8, the passenger moving mechanism 8 is operated while the driving force thereof is set at a constant value in a range where the distance L between the passenger's head and the head rest 3 detected by the distance detector 9 is smaller than a maximum reference value K set in advance, whereas the operation of the passenger moving mechanism 8 is prohibited in a range where the distance L exceeds the maximum referenced value K.

Figure 9:
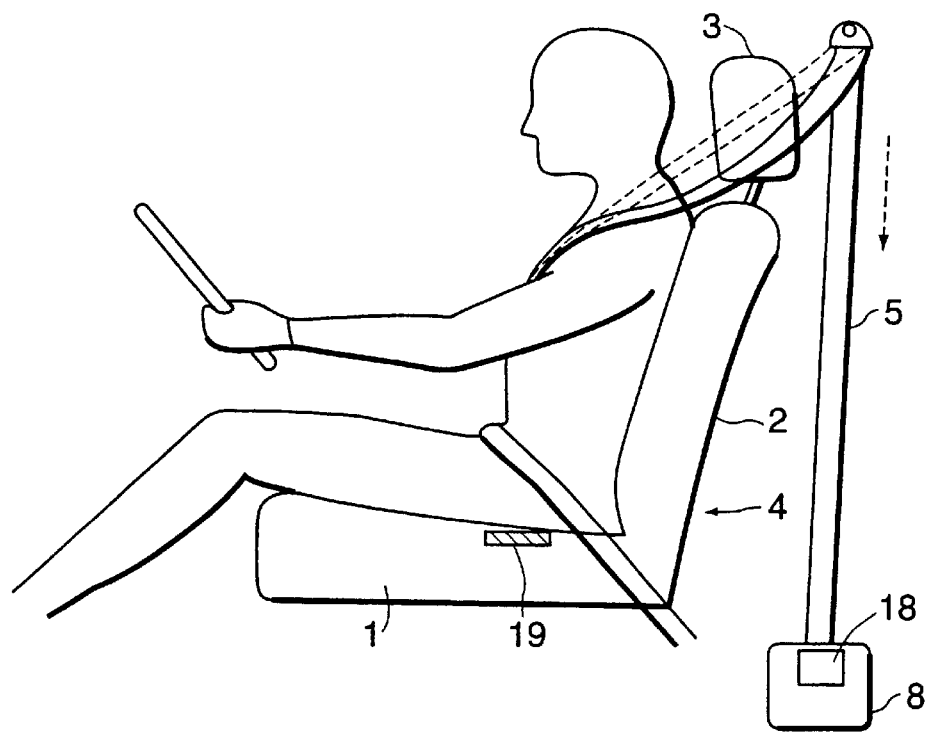
FIG. 9 is a diagram showing a passenger protecting apparatus for use in a vehicle according to a second embodiment of the invention.
Figure 10:
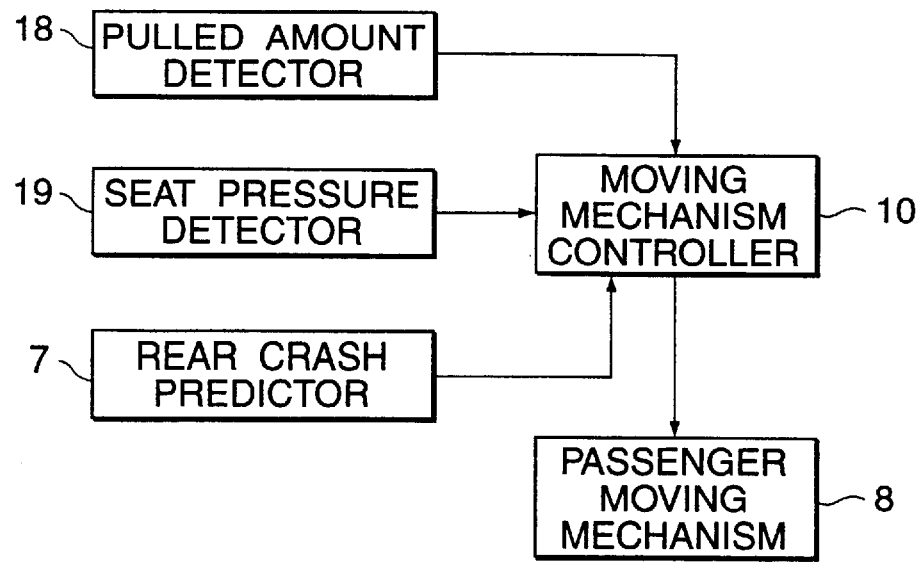
FIG. 10 is a block diagram showing a construction of the passenger protecting apparatus of the second embodiment.

FIGS. 9 and 10 show a passenger protecting apparatus for use in a vehicle according to a second embodiment of the invention. In this embodiment, there is provided a pulled amount detector 18 for detecting a pulled amount of the seat belt 5. A moving mechanism controller 10 sets the driving force of a passenger moving mechanism 8 larger as the pulled amount of a seat belt 5 increases on the basis of a judgment that the more the pulled amount of the seat belt 5 detected by the pulled amount detector 18, the farther the passenger's head is from the head rest 3.

In this construction, by setting the driving force of the passenger moving mechanism 8 at a larger value in a state where a large pulled amount of the seat belt 5 is detected by the pulled amount detector 18, i.e., the passenger is assumed to be seated at the front part of the seat 4 when the rear crash of the vehicle is predicted, the passenger's back can be quickly and securely pressed against the seat back 2 to actuate the head rest driving mechanism 6.

Further, it may be preferable to provide a seat pressure detector 19 for detecting a pressure acting on the seat cushion 2. In this case, the moving mechanism controller 10 controls the driving force of the passenger moving mechanism 8 according to the pressure detected by the seat pressure detector 19, i.e., the passenger's weight, in such a manner as to set the driving force of the passenger moving mechanism 8 larger as the pressure detected by the seat pressure detector 19 increases. In this construction, since the driving force acts according to the passenger's weight, the back of a heavy passenger can be securely pressed against the seat back 2 during the rear crash while preventing a load larger than necessary from acting on a light-weight passenger.

Figure 11:
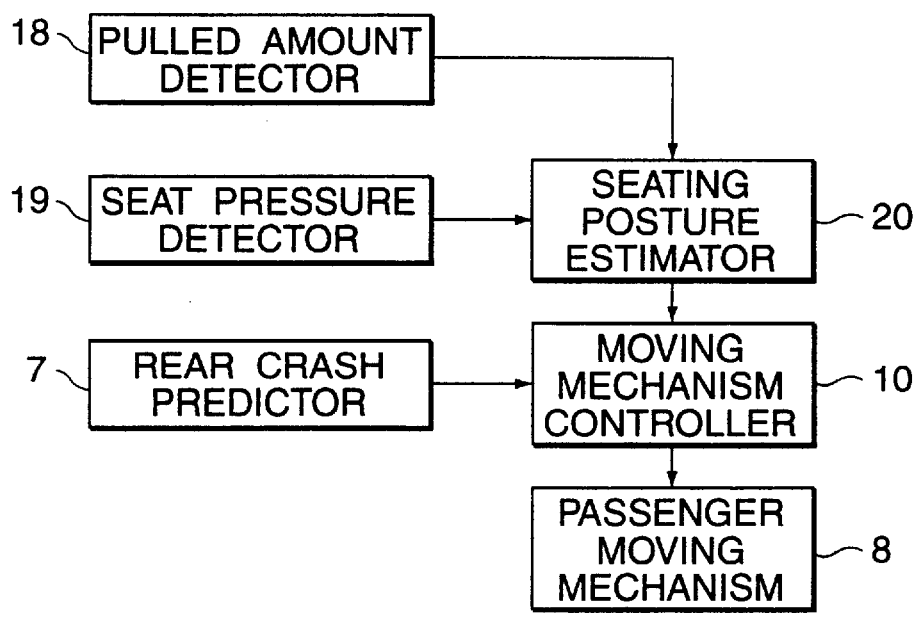
FIG. 11 is a block diagram showing a construction of a modification of the passenger protecting apparatus of the second embodiment.
Figure 12:
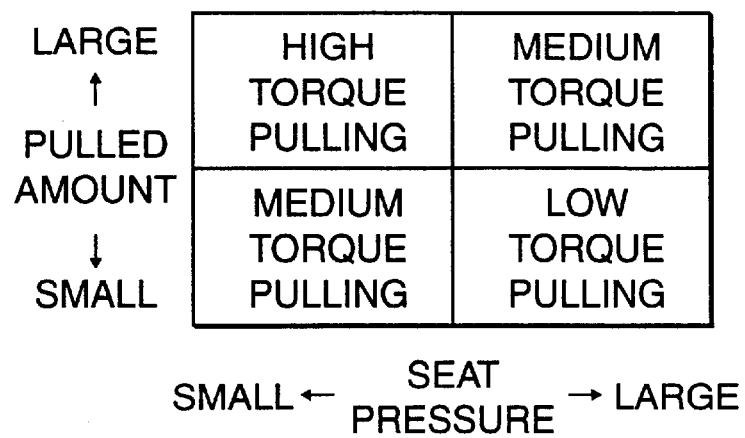
FIG. 12 is a map for driving force control for a passenger moving mechanism of the modified passenger protecting apparatus of FIG. 11.

Further, as shown in FIG. 11, it may be appreciated to provide a seating posture estimator 20 for estimating a seating posture of the passenger in accordance with the pulled amount of the seat belt 5 detected by the pulled amount detector 18 and the pressure acting on the seat cushion 2 detected by the seat pressure detector 19, i.e., the passenger's weight. Then, the moving mechanism controller 10 may control the driving force of the passenger moving mechanism 8 according to the seating posture of the passenger estimated by the seating posture estimator 20 with reference to a map shown in FIG. 12.

More specifically, in the case that the passenger's weight detected by the seat pressure detector 19 is small despite the large pulled amount of the seat belt 5 detected by the pulled amount detector 18, the passenger is thought to be bending forward by largely pulling the seat belt 5. Accordingly, the pulling torque of the seat belt 5 is set at high level to increase the driving force of the passenger moving mechanism 8, thereby quickly pressing the passenger's back against the seat back 2. Conversely, in the case that the passenger has a heavy weight despite the small pulled amount of the seat belt 5, the passenger's back is thought to be in close contact with the seat back 2. Accordingly, the pulling torque of the seat belt 5 is set at low level to decrease the driving force of the passenger moving mechanism 8, thereby preventing an unnecessarily large load from acting on the passenger.

In the case that the passenger has a heavy weight and the pulled amount of the seat belt 5 is large or in the case that the passenger has a light weight and the pulled amount of the seat belt 5 is small, the posture of the passenger is thought to be normal. Accordingly, the pulling force of the seat belt 5 is set at medium level to set the medium driving force of the passenger moving mechanism 8, thereby properly pressing passenger's back against the seat back 2 while preventing an unnecessarily large load from acting on the passenger.

Figure 13:
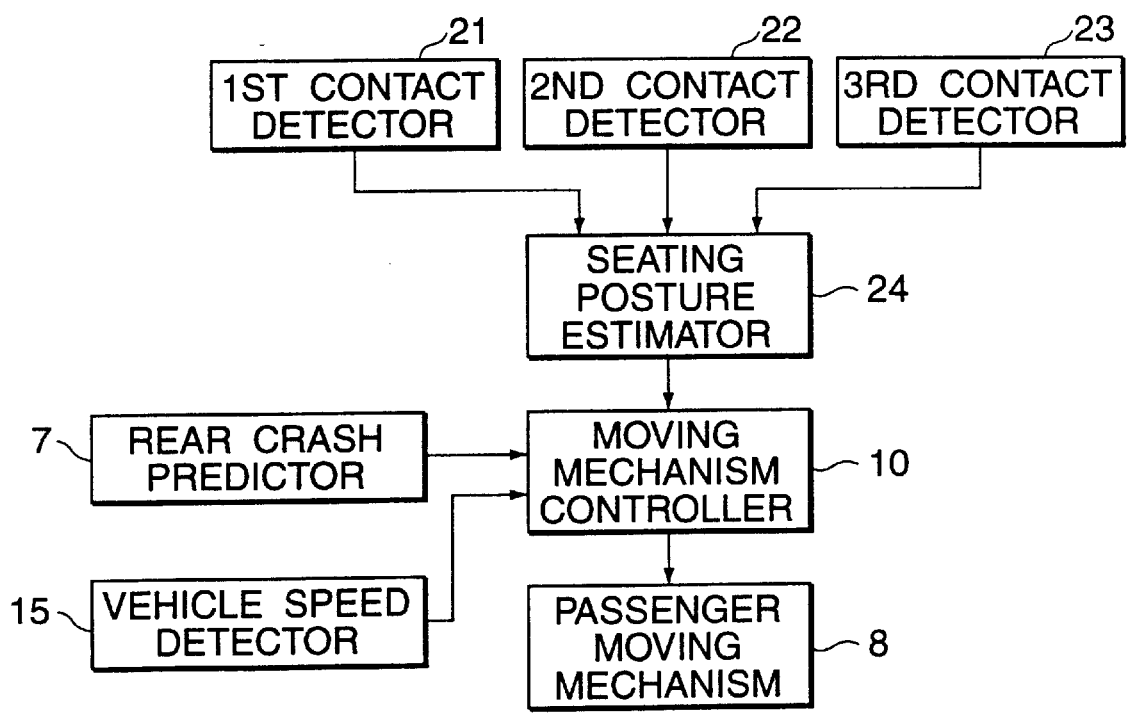
FIG. 13 is a block diagram showing a construction of a passenger protecting apparatus for use in a vehicle according to a third embodiment of the invention.
Figure 14:
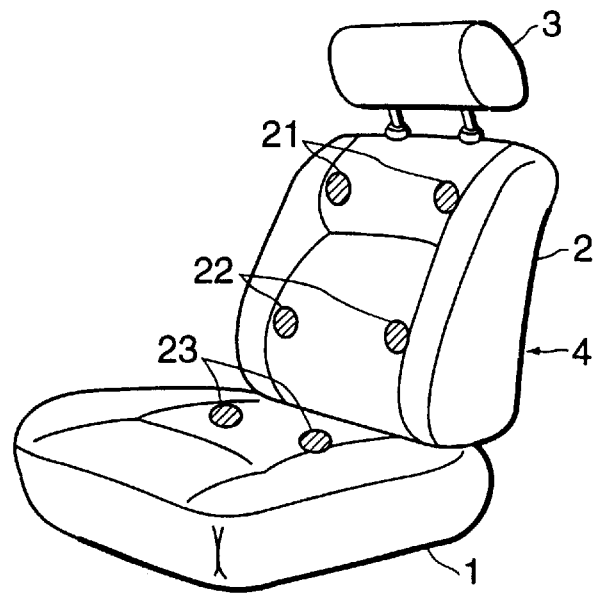
FIG. 14 is a diagram showing installation positions of contact detectors in the passenger protecting apparatus of FIG. 13.

FIGS. 13 and 14 show a passenger protecting apparatus for use in a vehicle according to a third embodiment of the invention. In this embodiment, there are provided a first contact detector 21 including, e.g., a pressure sensor or a contact sensor for detecting the contact of the passenger's body with the upper part of the seat back 2, a second contact detector 22 including, e.g., a pressure sensor for detecting the contact of the passenger's body with the lower part of the seat back 2, and a third contact sensor 23 including, e.g., a pressure sensor for detecting the contact of the passenger's body with the rear part of the seat cushion 1, and a seating posture estimator 24 for estimating a seating posture of the passenger based on detection signals of the contact detectors 21 to 23. A moving mechanism controller 10 controls the driving force of a passenger moving mechanism 8 according to a seating posture of the passenger estimated by the seating posture estimator 24.

Figure 15A:
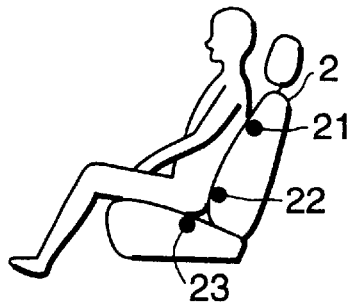
FIGS. 15A to 15D are diagrams showing relationships between different seating postures of the passenger and the contact detectors.
Figure 15B:
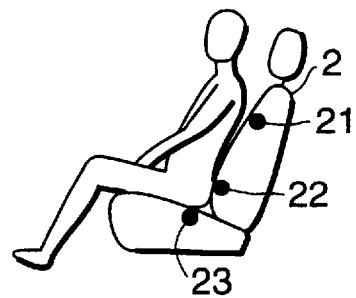
Figures 16, 17:
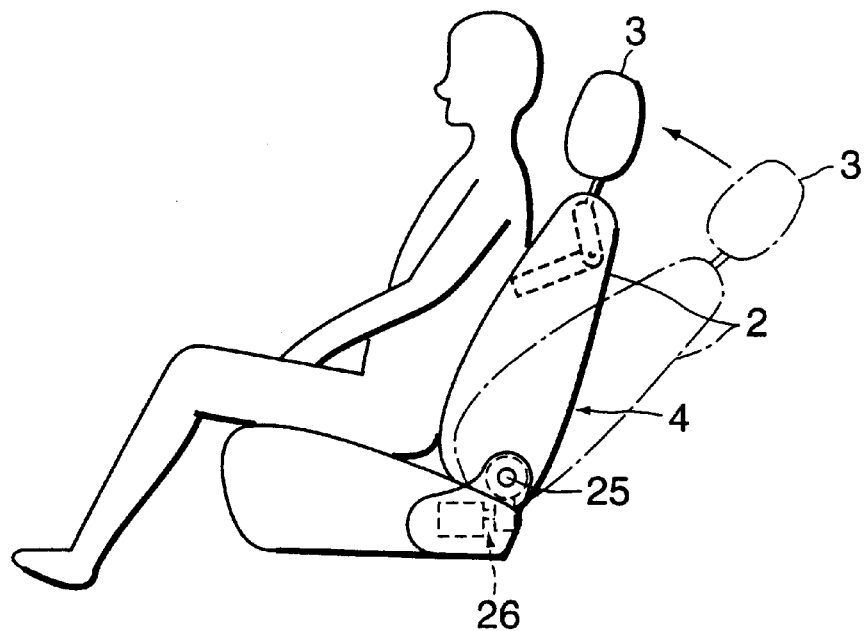
FIG. 16 is a map for driving force control for a passenger moving mechanism of the passenger protecting apparatus of FIG. 13.
FIG. 17 is a diagram showing a passenger protecting apparatus for use in a vehicle according to a fourth embodiment of the invention.

More specifically, in the case of a seating posture where the respective contact detectors 21 to 23 are all ON, i.e., a seating posture A where the passenger's body is in close contact with the seat back 2 as shown in FIG. 15A, the driving force of the passenger moving mechanism 8 is set at about medium level as shown in FIG. 16. In the case of a seating posture where only the first contact detector 21 is OFF, i.e., a seating posture B where the passenger's body is slightly away from the seat back 2 as shown in FIG. 15B, the driving force of the passenger moving mechanism 8 is set at high level to quickly bring the passenger's back into contact with the seat back 2.

Figure 15C:
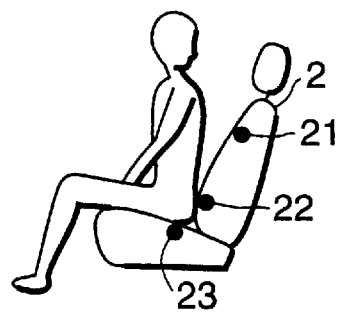
Figure 15D:
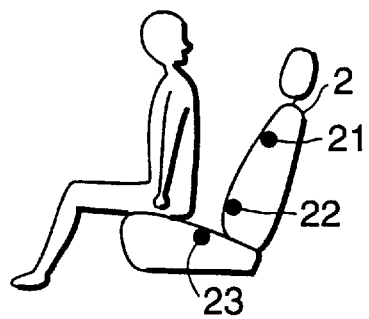

Further, in the case of a seating posture where the first and second contact detectors 21, 22 are OFF, i.e., a seating posture C where the passenger's body is fairly away from the seat back 2 as shown in FIG. 15C, the driving force of the passenger moving mechanism 8 is set at low level, thereby bringing the passenger's back into contact with the seat back 2 while preventing an unnecessarily large load from acting on the passenger. Furthermore, in the case of a seating posture where the respective contact detectors 21 to 23 are all OFF, i.e., a seating posture D where the passenger's body is largely away from the seat back 2 such as during the backward driving as shown in FIG. 15D, the moving mechanism controller 10 prohibits the operation of the passenger moving mechanism 8, thereby preventing the passenger's body from been unnecessarily restricted by the seat belt 5.

Further, it may be preferable to provide a vehicle speed detector 15 for detecting the running speed of the vehicle is provided, and the operation of the passenger moving mechanism 8 is prohibited when the vehicle speed detected by the vehicle speed detector 15 is discriminated to be higher than the predetermined reference vehicle speed. This prevents an occurrence of an undesirable event where the body of a driver concentrating on driving at a high speed is unnecessarily restricted by the passenger moving mechanism 8 when the rear crash of the vehicle is predicted.

Instead of the passenger moving mechanism 8 comprised of the pre-tensioner, further, a passenger moving mechanism comprised of an air bag device may be used to move the passenger toward the seat back 2 when the rear crash of the vehicle is predicted, and the head rest driving mechanism 6 may be actuated after the passenger's back is pressed against the seat back 2.

Figure 18:
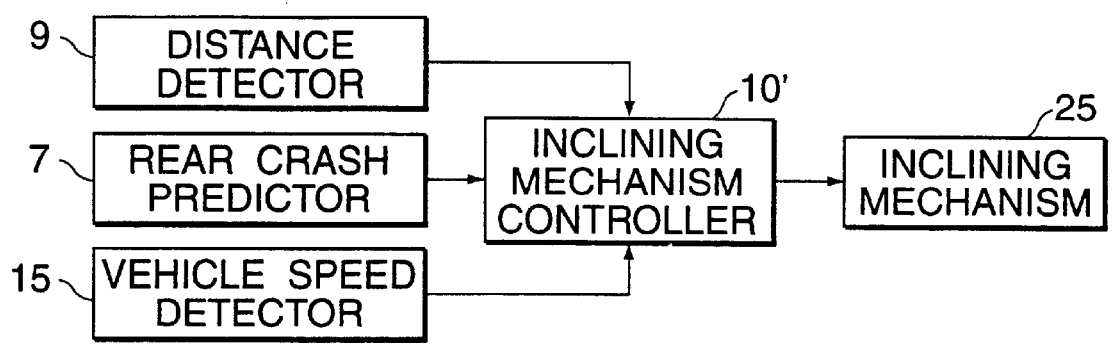
FIG. 18 is a block diagram showing a construction of the passenger protecting apparatus of FIG. 17.

FIGS. 17 and 18 show a passenger protecting apparatus for use in a vehicle according to a fourth embodiment of the invention. In this embodiment, a seat back 2 is inclinably supported about a reclining pivot 25 and an inclining mechanism 26 having a drive motor or the like for inclining the seat back 2. The seat back 2 is inclined forward of the vehicle body by the inclining mechanism 26 when the rear crash of the vehicle is predicted by a rear crash predictor 7.

In this construction, the passenger's back can be securely pressed against the seat back 2 during the rear crash of the vehicle by inclining the seat back 2 forward of the vehicle body by the inclining mechanism 26 when the rear crash of the vehicle is predicted. Thus, a head rest 3 can be properly moved forward by the head rest driving mechanism 6 during the rear crash of the vehicle, thereby effectively supporting the passenger's head by the head rest 3.

As described above, an inventive passenger protecting apparatus comprises a head rest driving mechanism for driving a head rest forward according to a pressing contact force generated when the passenger back is pressed against the seat back during a rear crash of the vehicle, a rear crash predictor for predicting a rear crash of the vehicle, and a passenger moving mechanism for moving the passenger toward the seat back when a rear crash of the vehicle is predicted by the rear crash predictor. Accordingly, even if the passenger or the driver is bending forward when a rear crash is predicted, his back can be securely pressed against the seat back during the rear crash of the vehicle. Therefore, the head rest can be moved forward by the head rest driving mechanism during the rear crash of the vehicle to effectively support the passenger's head by the head rest.

The passenger moving mechanism preferably includes a pre-tensioner for a seat belt. With this construction, the passenger is moved toward the seat back by the pre-tensioner when the rear crash of the vehicle is predicted by the rear crash predictor. Thus, the passenger's back is pressed against the seat back during the rear crash of the vehicle to protect the passenger and the head rest is properly driven forward by the head rest driving mechanism.

There may be further provided a distance detector for detecting a distance between the passenger's head and the head rest, and a moving mechanism controller for controlling a driving force of the passenger moving mechanism according to the distance between the passenger's head and the head rest detected by the distance detector. With this construction, the driving force of the passenger moving mechanism for moving the passenger toward the seat back is controlled at a proper value according to the distance between the passenger's head and the head rest detected by the distance detector when the rear crash of the vehicle is predicted by the rear crash predictor. Accordingly, the passenger's back can be effectively pressed against the seat back during the rear crash of the vehicle, and the head rest can be properly driven forward by the head rest driving mechanism according to the created pressing contact force.

Further, the moving mechanism controller preferably controls the driving force of the passenger moving mechanism to cause the passenger to move forward with a larger force when the distance between the passenger's head and the head rest detected by the distance detector is large than when it is small. With this construction, the driving force of the passenger moving mechanism is set at a larger value when the distance between the passenger's head and the head rest detected by the distance detector is large at the time of predicting the rear crash of the vehicle than when this distance is small. Accordingly, the passenger's back can be quickly pressed against the seat back. Further, since the driving force of the passenger moving mechanism is set at a small value when the above distance is small, it prevents the passenger from being restricted more than necessary by the passenger moving mechanism.

The moving mechanism controller preferably controls the driving force of the passenger moving mechanism such that the passenger is moved forward with a larger force as the distance between the passenger's head and the head rest detected by the distance detector gets larger in a range where the detected distance is smaller than a predetermined reference value. With this construction, the driving force of the passenger moving mechanism is set at a larger value as the distance between the passenger's head and the head rest detected by the distance detector increases when the detected distance is discriminated to be smaller than the predetermined reference value at the time of predicting the rear crash of the vehicle. Thus, the passenger's back can be quickly pressed against the seat back.

Further, there may be provided a pulled amount detector for detecting a pulled amount of a seat belt, and a moving mechanism controller for controlling a driving force of the passenger moving mechanism such that the driving force increases as the pulled amount of the seat belt detected by the pulled amount detector increases. With this construction, the driving force of the passenger moving mechanism is set at a large value when a large pulled amount of the seat belt is detected by the pulled amount detector, i.e., when the passenger is assumed to be seated on the front part of the seat. Therefore, the passenger's back can be quickly pressed against the seat back.

There may be further provided a seat pressure detector for detecting a pressure acting on a seat cushion, and a moving mechanism controller for controlling a driving force of the passenger moving mechanism such that the driving force increases as the pressure detected by the seat pressure detector increases. With this construction, the seat pressure corresponding to the weight of the passenger seated on the seat is detected by the seat pressure detector when the rear crash of the vehicle is predicted, and the driving force of the passenger moving mechanism is set at a larger value as the detected pressure increases. Therefore, the passenger's back can be securely pressed against the seat back even if he has a heavy weight.

There may be further provided a pulled amount detector for detecting a pulled amount of a seat belt, a seat pressure detector for detecting a pressure acting on a seat cushion, a seating posture estimator for estimating a seating posture of the passenger in accordance with detection signals of the pulled amount detector and the seat pressure detector, and a moving mechanism controller for controlling a driving force of the passenger moving mechanism according to the seating posture of the passenger estimated by the seating posture estimator. With this construction, the seating posture of the passenger is estimated by the seating posture estimator in accordance with the detection signals of the pulled amount detector and the seat pressure detector, and the driving force of the passenger moving mechanism is controlled according to the estimated seating posture. Therefore, the passenger's back can be securely pressed against the seat back during the rear crash of the vehicle.

There may be further provided a plurality of contact detectors for detecting the contact of the passenger's body with a seat, a seating posture estimator for estimating a seating posture of the passenger in accordance with detection signals of the contact detectors, and a moving mechanism controller for controlling a driving force of the passenger moving mechanism according to the seating posture of the passenger estimated by the seating posture estimator. With this construction, the seating posture of the passenger is estimated by the seating posture estimator in accordance with detection signals of the plurality of contact detectors, and the driving force of the passenger moving mechanism is controlled according to the estimated seating posture. Therefore, the passenger's back can be securely pressed against the seat back during the rear crash of the vehicle.

There may be further provided a vehicle speed detector for detecting a running speed of the vehicle, and the operation of the passenger moving mechanism is prohibited if the vehicle speed detected by the vehicle speed detector is higher than a predetermined reference vehicle speed. With this construction, the operation of the passenger moving mechanism is prohibited when the vehicle speed detected by the vehicle speed detector is discriminated to be larger than the predetermined reference vehicle speed at the time of predicting the rear crash of the vehicle. This prevents the passenger from being restricted by the passenger moving mechanism while the vehicle is running at a high speed.

Moreover, it may be appreciated to use an inclining mechanism for inclining the seat back forward of a vehicle body when the rear crash of the vehicle is predicted by the rear crash predictor, instead of the passenger moving mechanism. With this construction, the seat back is inclined forward of the vehicle body by the inclining mechanism when the rear crash of the vehicle is predicted by the rear crash predictor. Accordingly, the passenger's back can be securely pressed against the seat back during the rear crash of the vehicle, and the head rest can be properly driven forward by the head rest driving mechanism according to the created pressing contact force.

Although the present invention has been fully described by way of examples with reference to the accompanying drawings, it is understood that various changes and modifications will be apparent to those skilled in the art. Therefore, unless otherwise such changes and modifications depart from the scope of this invention as defined in the following section, they should be construed as being included therein.

What is claimed is:

1. A passenger protecting apparatus for use in a vehicle, comprising:

a head rest driving mechanism which drives a head rest forward according to a pressing contact force generated when a passenger's back is pressed against a seat back during a rear crash of the vehicle;

a rear crash predictor which predicts a rear crash of the vehicle before the rear crash of the vehicle occurs;

a passenger moving mechanism which moves the passenger toward the seat back and makes the passenger contact the seat back before the rear crash of the vehicle occurs when the rear crash of the vehicle is predicted by the rear crash predictor;

a distance detector which detects a distance between the passenger's head and the head rest; and a moving mechanism controller which controls the driving force of the passenger moving mechanism according to the distance between the passenger's head and the head rest detected by the distance detector, wherein the moving mechanism controller controls the driving force of the passenger moving mechanism to cause the passenger to move backward with a larger force when the distance between the passenger's head and the head rest detected by the distance detector is large than when it is small.

2. A passenger protecting apparatus according to claim 1, wherein the passenger moving mechanism includes a pre-tensioner for the seat belt which takes up the seat belt before the rear crash of the vehicle occurs when the rear crash of the vehicle is predicted by the rear crash predictor to thereby move the passenger toward the seat back.

3. A passenger protecting apparatus according to claim 1, wherein the moving mechanism controller controls the driving force of the passenger moving mechanism to cause the passenger to move backward with a larger force as the distance between the passenger's head and the head rest detected by the distance detector increases in a range where the detected distance is smaller than a predetermined reference value.

4. A passenger protecting apparatus according to claim 1, further comprising a vehicle speed detector which detects a running speed of the vehicle, wherein the operation of the passenger moving mechanism is prohibited if the vehicle speed detected by the vehicle speed detector is higher than a predetermined reference vehicle speed.

5. A passenger protecting apparatus according to claim 2, further comprising:

a pre-tensioner controller which controls a seat belt take-up force of the pre-tensioner according to the distance between the passenger's head and the head rest detected by the distance detector, wherein the pre-tensioner controller controls the pre-tensioner such that the seat belt take-up force increases as the distance between the passenger's head and the head rest detected by the distance detector increases in a range where the detected distance is smaller than a predetermined reference value.

6. A passenger protecting apparatus according to claim 2, further comprising:

a vehicle speed detector which detects a running speed of the vehicle, wherein the take-up of the seat belt by the pre-tensioner is prohibited if the vehicle speed detected by the vehicle detector is higher than a predetermined reference vehicle speed.

7. A passenger protecting apparatus for use in a vehicle, comprising:

a head rest driving mechanism which drives a head rest forward according to a pressing contact force generated when a passenger's back is pressed against a seat back during a rear crash of the vehicle;

a rear crash predictor which predicts a rear crash of the vehicle before the rear crash of the vehicle occurs;

a passenger moving mechanism which moves the passenger toward the seat back and makes the passenger contact the seat back before the rear crash of the vehicle occurs when the rear crash of the vehicle is predicted by the rear crash predictor;

a pulled amount detector which detects a pulled amount of the seat belt; and a moving mechanism controller which controls the driving force of the passenger moving mechanism such that the driving force increases as the pulled amount of the seat belt detected by the pulled amount detector increases.

8. A passenger protecting apparatus according to claim 7, further comprising:

a seat pressure detector which detects a pressure acting on a seat cushion, wherein the moving mechanism controller controls the driving force of the passenger moving mechanism such that the driving force increases as the pressure detected by the seat pressure detector increases.

9. A passenger protecting apparatus according to claim 7, further comprising a vehicle speed detector which detects a running speed of the vehicle, wherein the operation of the passenger moving mechanism is prohibited if the vehicle speed detected by the vehicle speed detector is higher than a predetermined reference vehicle speed.

10. A passenger protecting apparatus according to claim 7, Wherein the passenger moving mechanism includes a pre-tensioner for the seat belt which takes up the seat belt before the rear crash of the vehicle occurs when the rear crash of the vehicle is predicted by the rear crash predictor to thereby move the passenger toward the seat back.

11. A passenger protecting apparatus according to claim 10, further comprising:

a seat pressure detector which detects a pressure acting on a seat cushion, wherein the moving mechanism controller controls the driving force of the passenger moving mechanism such that the driving force increases as the pressure detected by the seat pressure detector increases.

12. A passenger protecting apparatus according to claim 10, further comprising a vehicle speed detector which detects a running speed of the vehicle, wherein the operation of the passenger moving mechanism is prohibited if the vehicle speed detected by the vehicle speed detector is higher than a predetermined reference vehicle speed.

13. A passenger protecting apparatus for a vehicle, comprising:

a head rest driving mechanism which drives a head rest forward according to a pressing contact force generated when a passenger's back is pressed against a seat back during a rear crash of the vehicle;

a rear crash predictor which predicts a rear crash of the vehicle before the rear crash of the vehicle occurs; and an inclining mechanism which causes the seat back to incline forward of a vehicle body and makes the passenger contact the seat back before the rear crash of the vehicle occurs when the rear crash of the vehicle is predicted by the rear crash predictor.

* * * * *